United States Patent
Forgeat et al.

(10) Patent No.: US 12,456,037 B2
(45) Date of Patent: Oct. 28, 2025

(54) USING GENERATIVE ADVERSARIAL NETWORKS (GANs) TO ENABLE SHARING OF SENSITIVE DATA

(71) Applicant: Telefonaktiebolaget LM Ericsson (publ), Stockholm (SE)

(72) Inventors: Julien Forgeat, San Jose, CA (US); Meral Shirazipour, San Jose, CA (US); Ricardo Souza, Indaiatuba (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1044 days.

(21) Appl. No.: 17/423,794

(22) PCT Filed: Jan. 18, 2019

(86) PCT No.: PCT/IB2019/050445
§ 371 (c)(1),
(2) Date: Jul. 16, 2021

(87) PCT Pub. No.: WO2020/148573
PCT Pub. Date: Jul. 23, 2020

(65) Prior Publication Data
US 2022/0076066 A1 Mar. 10, 2022

(51) Int. Cl.
*G06F 18/214* (2023.01)
*G06N 3/045* (2023.01)
*G06N 3/0475* (2023.01)

(52) U.S. Cl.
CPC ......... *G06N 3/0475* (2023.01); *G06F 18/214* (2023.01); *G06N 3/045* (2023.01)

(58) Field of Classification Search
CPC ...... G06F 18/214; G06N 3/045; G06N 3/047; G06N 3/0475; G06N 3/08
See application file for complete search history.

(56) References Cited

U.S. PATENT DOCUMENTS 10,540,798 B1 *   1/2020   Walters ................. G06N 3/088
11,042,758 B2 *   6/2021   Jaipuria ................ G06T 11/00
(Continued)

OTHER PUBLICATIONS

Zhang et al. âStackGAN++: Realistic Image Synthesis with Stacked Generative Adversarial Networksâ Jun. 28, 2018, arxiv.org, <doi.org/10.48550/arXiv.1710.10916> (Year: 2018).*
(Continued)

*Primary Examiner* — James D. Rutten
(74) *Attorney, Agent, or Firm* — Nicholson De Vos Webster & Elliott LLP

(57) ABSTRACT

A method generates synthetic data by a data collection system where the synthetic data meets a first threshold for accuracy and a second threshold for protecting sensitive data from recovery from the synthetic data. The method includes collecting data including sensitive data and non-sensitive data, executing a first machine learning model to generate the synthetic data from the collected data where the synthetic data meets the first threshold, executing a second machine learning model to update the synthetic data to meet the second threshold, checking whether the updated synthetic data meets the first threshold, releasing the updated synthetic data where the first threshold is met, and re-executing the first machine learning model and second machine learning model to update the synthetic data where the first threshold is not met during the checking.

17 Claims, 7 Drawing Sheets

ML MODEL 2: ASSURES THAT DISCRIMINATOR 2 CANNOT PREDICT C_SENSITIVE DATA

(56) References Cited

U.S. PATENT DOCUMENTS

| | | | |
|---|---|---|---|
| 11,188,827 B1* | 11/2021 | Mugan | G06N 3/088 |
| 2019/0057521 A1* | 2/2019 | Teixeira | A61B 6/545 |
| 2019/0266442 A1* | 8/2019 | Malur Srinivasan | G06V 10/82 |
| 2020/0134446 A1* | 4/2020 | Soni | G06N 3/047 |
| 2020/0294201 A1* | 9/2020 | Planche | G06F 18/2413 |
| 2021/0012028 A1* | 1/2021 | Cabot | G06F 9/547 |

OTHER PUBLICATIONS

A. Jourabloo, X. Yin and X. Liu, "Attribute preserved face de-identification," 2015 International Conference on Biometrics (ICB), Phuket, Thailand, 2015, pp. 278-285, doi: 10.1109/ICB.2015.7139096. (Year: 2015).*

Bellemare, et al., "The Cramer Distance as a Solution to Biased Wasserstein Gradients," May 30, 2017, https://arxiv.org/pdf/1705.10743.pdf, pp. 1-20.

Choi, et al., "Generating Multi-label Discrete Patient Records using Generative Adversarial Networks," Proceedings of Machine Learning for Healthcare 2017, JMLR W&C Track vol. 68, https://arxiv.org/pdf/1703.06490.pdf, Jan. 11, 2018, pp. 1-20.

Deng, et al., "Structured Generative Adversarial Networks," 31st Conference on Neural Information Processing Systems (NIPS 2017), Nov. 5, 2017, https://proceedings.neurips.cc/paper/2017/file/c3535febaff29fcb7c0d20cbe94391c7-Paper.pdf, pp. 1-11.

Goodfellow, "NIPS 2016 Tutorial: Generative Adversarial Networks," Advances in Neural Information Processing Systems (NIPS 2016), Dec. 5-10, 2016, https://arxiv.org/pdf/1701.00160.pdf, pp. 1-57.

Goodfellow, "Security and Privacy of Machine Learning," RSA Conference, Apr. 16-20, 2018, https://published-prd.lanyonevents.com/published/rsaus18/sessionsFiles/8973/MLN-R14-Security-and-Privacy-of-Machine-Learning.pdf, pp. 1-30.

Goodfellow, et al., "Generative Adversarial Nets," Advances in Neural Information Processing Systems 27 (NIPS 2014), Dec. 8-11, 2014, https://proceedings.neurips.cc/paper/2014/file/5ca3e9b122f61f8f06494c97b1afccf3-Paper.pdf, pp. 1-9.

Li, et al., "Triple Generative Adversarial Nets," 31st Conference on Neural Information Processing Systems (NIPS 2017), https://arxiv.org/pdf/1703.02291.pdf, Nov. 5, 2017, pp. 1-15.

Liu, et al., "Coupled Generative Adversarial Networks," 30th Conference on Neural Information Processing Systems (NIPS 2016), Dec. 5-10, 2016, https://papers.nips.cc/paper/2016/file/502e4a16930e414107ee22b6198c578f-Paper.pdf, pp. 1-9.

Mottini, et al., "Airline Passenger Name Record Generation using Generative Adversarial Networks," ICML 2018 workshop on Theoretical Foundations and Applications of Deep Generative Models, https://arxiv.org/pdf/1807.06657.pdf, Jul. 17, 2018, pp. 1-9.

Narayanan, et al., "Robust De-anonymization of Large Datasets (How To Break Anonymity of the Netflix Prize Dataset)," https://www.semanticscholar.org/paper/How-To-Break-Anonymity-of-the-Netflix-Prize-Dataset-Narayanan-Shmatikov/c40e5c8b4957074644acdaf1f9f4332e63b5846b?p2df, Feb. 5, 2008, pp. 1-24.

Oleszkiewicz, et al., "Siamese Generative Adversarial Privatizer for Biometric Data," 14 Asian Conference on Computer Visio, Revised Selected Papers, Part V, In Distributed Computing: 19th Int'l. Conf., DISC 2005, Dec. 2-6, 2018, Oct. 8, 2018, pp. 1-16.

Park, et al., "Data Synthesis based on Generative Adversarial Networks," Proceedings of the VLDB Endowment, vol. 11, No. 10, Jul. 2, 2018, https://arxiv.org/pdf/1806.03384.pdf, pp. 1-16.

Shin, et al., "Medical Image Synthesis for Data Augmentation and Anonymization Using Generative Adversarial Networks," Springer Nature, 2018, SASHIMI 2018, LNCS 11037, pp. 1-11.

Shrivastava, et al., "Learning from Simulated and Unsupervised Images through Adversarial Training," Proceedings of the IEEE Conference on Computer Vision and Pattern Recognition (CVPR), 2017, https://openaccess.thecvf.com/content_cvpr_2017/papers/Shrivastava_Learning_From_Simulated_CVPR_2017_paper.pdf, pp. 1-10.

Wang, et al., "Deep & Cross Network for Ad Click Predictions," ADKDD'17, Art. No. 12, Aug. 2017 https://dl.acm.org/doi/pdf/10.1145/3124749.3124754, pp. 1-7.

Wikipedia, "AOL search data leak," https://en.wikipedia.org/wiki/AOL_search_data_leak, last edited Nov. 17, 2018, pp. 1-4.

Wikipedia, "Artificial neural network," https://en.wikipedia.org/wiki/Artificial_neural_network, last edited Jan. 14, 2019, 44 pages.

Louppe G., "Learning to Pivot with Adversarial Networks", 31st Conference on Neural Information Processing Systems (NIPS 2017), Long Beach, CA, USA, pp. 982-991, http://papers.nips.cc/paper/6699-learning-to-pivot-with-adversarial-networks.pdf.

* cited by examiner

USING GENERATIVE ADVERSARIAL NETWORKS (GANs) TO ENABLE SHARING OF SENSITIVE DATA

CROSS-REFERENCE TO RELATED APPLICATIONS

This application is a national stage of International Application No. PCT/IB2019/050445, filed Jan. 18, 2019, which is hereby incorporated by reference.

TECHNICAL FIELD

Embodiments of the invention relate to the field of synthetic data generation; and more specifically, to the process of generating synthetic data that represents collected data for modeling activity in computing environments.

BACKGROUND ART

Machine learning (ML) is the field of statistical models executed by computer systems to progressively improve their performance on a specific task. Machine learning algorithms build a model of sample data, referred to as training data to make predictions or decisions without being specifically configured or programmed to perform the given task.

There are many different types of machine learning. One specific type of machine learning is referred to as artificial neural networks or simply neural networks as used herein. Neural networks are inspired by biological neural networks that constitute animal brains. The neural network is a framework for different machine learning algorithms to work together to process complex data inputs. The neural networks can be trained to perform a task by processing training data and being given feedback on the success of the performance of the task. The neural network is composed of nodes or 'artificial neurons' that model real neurons. These artificial neurons are linked with one another like synapses in the brain. The links between neurons have weights and the neurons themselves implement non-linear functions. As learning proceeds by iterative input of training data and receipt of feedback the weights are adjusted to learn to better perform the task.

Machine learning and specifically neural networks are trained to be task specific. The application of a neural network to any given task requires collection of a proper set of training data and determination of proper feedback to obtain useable results. Thus, applications of machine learning require significant research and development in terms of training data development and configuration of the constituent components to obtain useful results.

SUMMARY

In one embodiment, a method of generating synthetic data by a data collection system where the synthetic data meets a first threshold for accuracy and a second threshold for protecting sensitive data from recovery from the synthetic data. The method includes collecting data including sensitive data and non-sensitive data, executing a first machine learning model to generate the synthetic data from the collected data where the synthetic data meets the first threshold, executing a second machine learning model to update the synthetic data to meet the second threshold, checking whether the updated synthetic data meets the first threshold, releasing the updated synthetic data where the first threshold is met, and re-executing the first machine learning model and second machine learning model to update the synthetic data where the first threshold is not met during the checking.

In another embodiment, a non-transitory machine-readable medium having stored therein a set of instructions which when executed causes a computing system to perform a set of operations in the method of generating synthetic data by a data collection system where the synthetic data meets a first threshold for accuracy and a second threshold for protecting sensitive data from recovery from the synthetic data. The set of operations includes collecting data including sensitive data and non-sensitive data, executing a first machine learning model to generate the synthetic data from the collected data where the synthetic data meets the first threshold, executing a second machine learning model to update the synthetic data to meet the second threshold, checking whether the updated synthetic data meets the first threshold, releasing the updated synthetic data where the first threshold is met, and re-executing the first machine learning model and second machine learning model to update the synthetic data where the first threshold is not met during the checking.

In a further embodiment, a computer system to implement a method of generating synthetic data where the synthetic data meets a first threshold for accuracy and a second threshold for protecting sensitive data from recovery from the synthetic data. The computer system includes a non-transitory machine-readable medium having stored therein a data collector and a data synthesizer, and a processor coupled to the non-transitory machine-readable medium, the processor to execute the data collector and the data synthesizer, the data collector to collect data including sensitive data and non-sensitive data, the data synthesizer to execute a first machine learning model to generate the synthetic data from the collected data where the synthetic data meets the first threshold, to execute a second machine learning model to update the synthetic data to meet the second threshold, to check whether the updated synthetic data meets the first threshold, to release the updated synthetic data where the first threshold is met, and to re-execute the first machine learning model and second machine learning model to update the synthetic data where the first threshold is not met during the checking.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
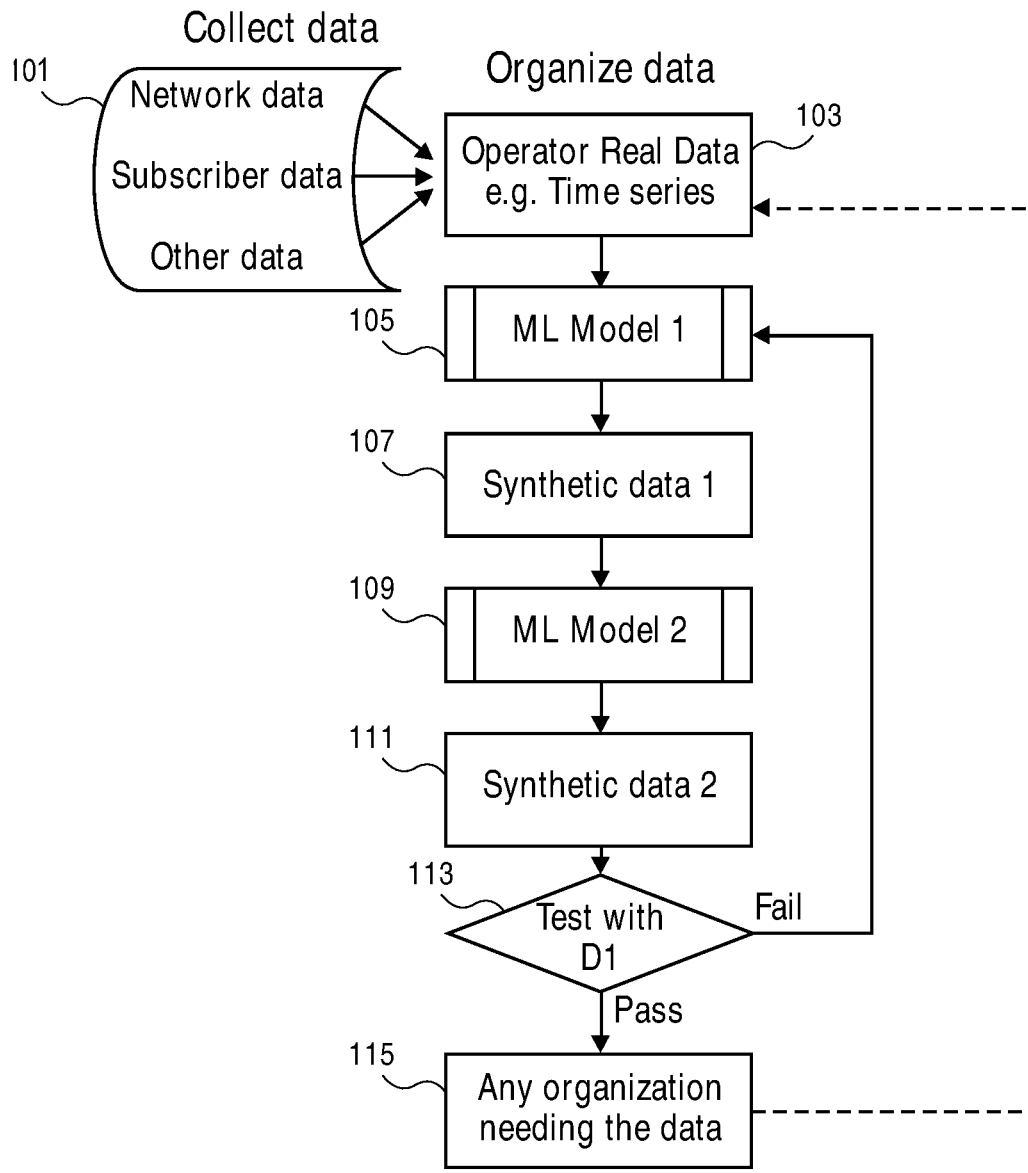
FIG. 1 is a flowchart of one embodiment of a process for synthetic data generation.

The following description describes methods and apparatus for generating synthetic data that accurately replicates real world computing data while protecting the personal information of users and confidential information of the associated real world computing environment. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals-such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

There are many types of computing environments where real world computing data is generated and subsequently collected for analysis. This analysis is often directed toward improving the execution of the computing environment in terms of execution efficiency, storage utilization, bandwidth utilization, timing (e.g., latencies) and similar characteristics of the computing environment. One example of such a computing environment is a computer network managed by a network operator. For sake of clarity and conciseness the embodiments are described primarily in relation to a computing network (i.e., a 'network' as used herein) operated by a network operator.

Network operator data is crucial for telecommunication-based machine learning solutions. However, the sensitive nature of this data prevents its widespread use by different groups within an organization or between organizations. Network operator data consists, in large part, of sensitive subscriber specific data in the form of personally identifiable information (PII), user mobility patterns, user interests, meta-data, and similar data. For privacy assurance, this data is often protected by local data laws in many jurisdictions. There are also other types of network operator data such as network and equipment related key performance indicators (KPIs) and other data that is sensitive for the network operator from a competitive operations perspective. There are many possible applications where network operator data could be used and mined for insights directly by the network operator, or other parties, which currently do not have the right to access this network operator data.

For example, in managed services settings, network operators outsource their subscriber and network management to third party companies. The network operators give access to their real collected data, but only to the team directly interfacing with that network operator. This is usually under strict contracts where the access to the real collected network operator data is often time and geographically limited (i.e., agreements may say that the data can only be used for a given period). Hence, any insight that can be extracted from the collected network operator data is only limited to that team, during that period, assuming their contract permitted this level of access.

With the advent of machine learning there are many potential research and operation benefits worth investigating that require access to network operator data to train machine-learning (ML) models. With these data access restrictions, there is currently no means to share the network operator data and/or insights gained from analysis of the network operator data from one team to the other, or between organizations. If the network operator data can be processed by the right technology to solve the data privacy issues, network operators can be incentivized to share their collected data. The embodiments offer such a technological solution. The embodiments provide a process to generate synthetic data from the actual collected network operator data where the synthetic data is anonymized to provide privacy, but the synthesized network operator data maintains other essential properties that make it useful for research and analysis related to machine learning. The embodiments allow machine learning models to be trained using the synthesized data without violating data privacy and other confidentiality agreements. However, only if the synthetic data is generated correctly, will the machine learning models trained on them be as performant as the machine learning models trained on the real collected data. The synthetic data can be compared to real collected data to determine performance in terms of positive predictive value (i.e., precision) and sensitivity (i.e., recall).

Generative Adversarial Networks

Generative Adversarial Networks (GANs) are a sort of machine learning that uses a generative model. Generative models are models trained on a training data set obtained from samples of an original data set. The generative model then learns a probability distribution of the sampled data (the model can output example samples, probability density distribution, or both). The generative model then produces synthetic samples that have a similar probability distribution to the original data set. Typically, GANs consist of two or more neural networks trained with loss functions optimized against each other in a zero-sum game.

The two neural networks in GANs are a generative model G and an adversarial classifier (discriminative model D, which is a trainable loss function), which are competing in a zero-sum game (i.e., zero-sum game according to game theory where this concept is when the gain of one is equal to the loss of the other). For example, a generative model G can focus on producing image samples that are indistinguishable from real data, while the adversarial classifier D tries to identify whether samples are from the generative model G or from the real data. Both networks are trained simultaneously such that the first model G improves at producing realistic samples, while the second model D becomes better at spotting the generated ones from the real ones. The generative model (i.e., a generator neural network) is a convolutional neural network and the discriminator (i.e., a discriminator neural network) is a classification neural network model.

Generating synthetic data to represent the actual sensitive data is a difficult problem. Existing systems cannot produce realistic enough data that is useful for a machine learning technique that results in realistic synthetic telecommunications data. The goal of the embodiments is for the synthetic data to be representative enough that a machine-learning model trained using them has the same performance as an ML model trained on the real data. However, there is no optimal way of generating synthetic data that is a good representation of the original data, specifically for telecommunications data, usable by machine learning models. The existing methods of generating synthetic data assume that generating synthetic data guarantees that PII information cannot be retrieved, but in fact fall short of such guarantees or produce synthetic data that is not sufficiently accurate. The embodiments overcome these deficiencies with a methodology to assure that both synthetic data accuracy requirements and privacy budgets are met. Both of these criteria are adjustable via thresholds in the overall process.

Some embodiments use generative adversarial networks (GANs) to allow network operators to share synthetic data and/or models trained from synthetic data instead of the real collected datasets and models thus mitigating the risk of PII information leakage. The synthetic data is generated with a first GAN and has similar statistical properties as the original real data. A second GAN is used to assure that no sensitive data is leaked into the synthetic data. Which data is sensitive can be determined by the network operator (i.e., the data owner). The accuracy budget (i.e., a first threshold for accuracy) of the synthetic data (compared to the real data) as well as the privacy budget (i.e., a second threshold for PII data recovery) are also parameters that can be set by the operator (i.e., the data owner). The embodiments have quantitative measurements of the accuracy budget (i.e., a first threshold T1) and privacy budget (i.e., a second threshold T2) of the real data and/or models. This gives a lot of flexibility in a sharing economy where operators that share more (both quantitively and qualitatively) can be rewarded.

The embodiments have the following advantages, they allow sharing of sensitive data (or a synthetic version thereof) for training machine learning applications by parties that do not have access to the real data (e.g. for privacy reasons), allow generation of realistic synthetic data, allow the network operator (or similar data owner) to determine the accuracy budget (how realistic the data is), allow the network operator (or similar data owner) to flexibly set the privacy budget on the sensitive data, guarantees the privacy budget, and give the network operators an opportunity to share their data in a data market. The examples are described in relation to the collection of network data by a network operator. However, the process, techniques, and structures described herein are applicable to general data collection and synthetic data generation in other contexts.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Synthetic Data Generation

In the embodiments, two GANs are configured to generate synthetic operator data. The process is provided an initial data set, referred to as $X_{real}$, that is composed of two sub-sets of data, safe data, referred to as $c_{safe}$, and data with private or personal user information referred to as $c_{sensitive}$, the combined set can be organized in two columns and notated $[[c_{safe}] [c_{sensitive}]]$. The network operator or data owner would specify which columns are sensitive, $c_{sensitive}$, and which columns are not, $c_{safe}$.

The embodiments have a goal to produce synthetic data $X_{syn}$, where (a) the $c_{sensitive}$ columns from $X_{real}$ are not retrievable from $X_{syn}$ and (b) machine learning models trained on $X_{syn}$ behave as well as if trained on $X_{real}$.

The embodiments produce the synthetic data set (e.g., $X_{syn}$) using multiple neural networks (e.g., from two separate GANs) that are trained as set forth below and described in relation to the process illustrated in FIG. 1.

FIG. 1 is a flowchart of one embodiment of a process for generating a synthetic data set. The process begins with data collection (Block 101). A data collector can constantly collect data from any sources that generates data over time. For example, in the case of network data, network nodes, end user devices and subscriber devices generate network data, subscriber data, and other types of data. Network data can be data that provides information about network operations such as traffic flow, network device status, link status, and similar information. Subscriber data can include information about user behavior (e.g., user location, user application usage, and similar information). The data collector can collect and add any other data to this collected data set and other third party data can also be used to augment the collected data (e.g., data related to local events, holidays, weather, advertisement, and similar information). The collected data can have any format, quantity, range or other characteristics and can be collected from any number of data sources. The data can be collected by a data collector as described further in reference to FIG. 2.

The process can organize the collected data into a standardized format (Block 103). In one example embodiment, the collected data is organized as a dataset for a given time period. The data can be organized into sub-sets such as $X_{real}$ (often in time series) and saved in a data base. $X_{real}$ can be in a tabular form, e.g., 2D table. At this stage, a data organizer identifies columns that contain sensitive information. These columns of data are labeled as $c_{sensitive}$. These columns contain PII info, network specific information such as exact network node location, identifiers, or type that would compromise network security if made available to untrusted entities. Other 'safe' non-sensitive data can be organized into a set of columns $C_{safe}$. While the embodiments describe the division of the collected data into tabular columns with a column or set of columns with non-sensitive data $C_{safe}$ and collected data in tabular columns or set of columns with sensitive data $C_{sensitive}$ this is provided by way of example and not limitation.

Figure 3A:
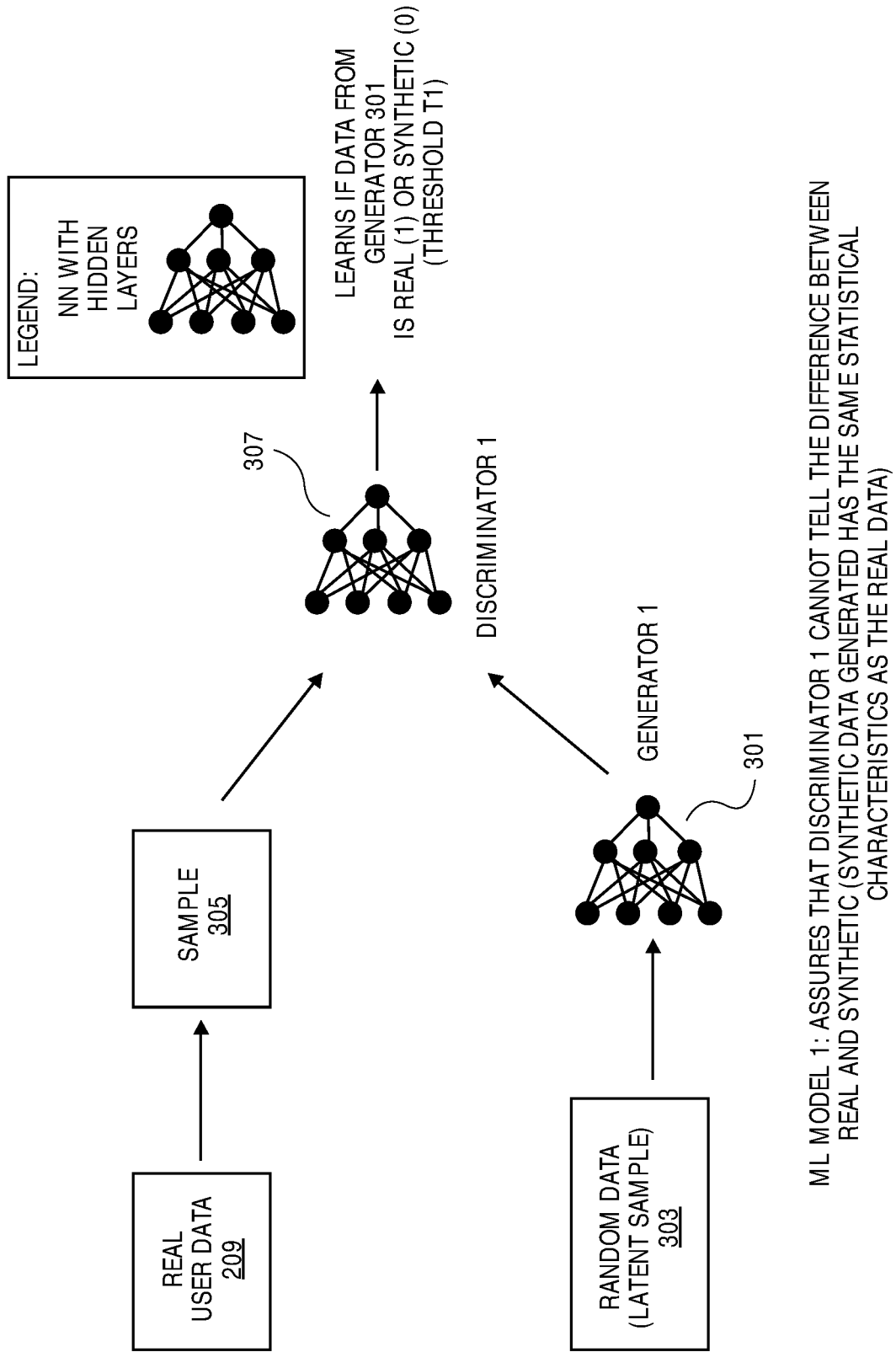
FIG. 3A is a diagram of one embodiment of a first machine-learning model.

The organized data can then be processed using machine learning. In the example, a first machine learning model is applied to the organized data set (Block 105). The first machine learning process can include a first neural network that is trained to produce synthetic data and a second neural network that is trained to discriminate between synthetic data and real data. The first machine learning model can generate a synthetic data set from the organized data set where the synthetic data set is to have characteristics that are similar to that of the original data set (Block 107). An example set of neural networks is shown in FIG. 3A, discussed herein below in further detail. If a data synthesizer has not been configured (e.g., by a network operator) to identify any sensitive data (e.g., as columns $C_{sensitive}$), then the data could be passed through entirely without significant processing to be published or otherwise disseminated to other organizations (Block 115).

Figure 3B:
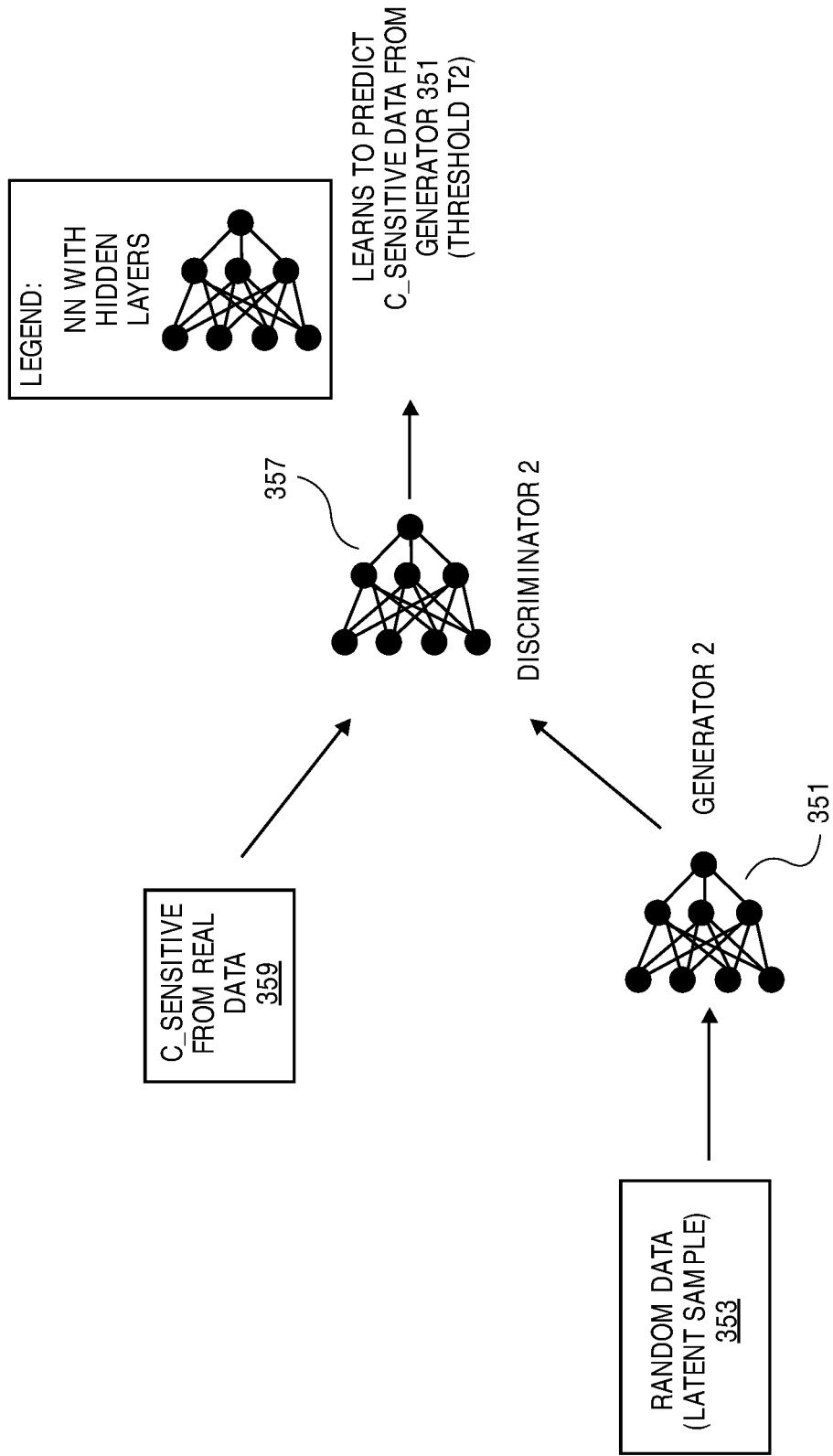
FIG. 3B is a diagram of one embodiment of a second machine-learning model.

After the initial set of synthesized data is generated, then the machine-learning model processes this synthesized data set (Block 109). A second machine learning model, e.g., a second GAN having a second set of neural networks, processes the data to anonymize the data such that sensitive data ($C_{sensitive}$) of the original data set can be retrieved from the synthesized data. In other embodiments, second learning model may anonymize all or more of the original data set beyond the sensitive data. FIG. 3B is an example of such a second machine learning model. The second machine learning model generates a second synthetic data set (Block 111).

The data synthesizer then tests the second synthetic data set (Block 113). The second synthetic data set is tested against the initial discriminator to make sure an accuracy threshold T1 is still met. If the second synthetic data set passes the test, then the synthetic data is approved to be made available to other organization (Block 115). If the test against threshold T1 fails, then the initial machine learning model is re-executed (Block 105). In the next iteration, the first machine-learning model can be updated with configuration information (not shown) from the second machine-learning model. The process can iterate in this manner updating the machine-learning model on each iteration and further processing the synthesized data until the threshold T1 is met after the updated synthesized data is output by the second machine-learning model.

As mentioned, after the threshold T1 is met, then the synthetic data (e.g., $X_{syn}$) can be shared with other organizations. The anonymization process can be repeated by the data synthesizer as new datasets are produced (i.e., new $X_{real}$) In some embodiments, the data collector could keep a copy of the synthetic dataset that is shared and periodically repeat threshold test against more recent real data sets (i.e., new $X_{real}$), and offer updates to the synthetic data in the case of a threshold T1 violation. In other embodiments, the data collector could run the data synthesizer with the second machine-learning model (Block 111) multiple times (sequentially) for various thresholds (e.g., T2, which represent different privacy budgets) per $c_{sensitive}$ data set. In other words, the $c_{sensitive}$ data could be grouped into different categories, e.g., PII data requiring 100% non-predictability while network node info could be tolerating up to 20% predictability. The range of acceptable values could be considered as hyperparameters that can be tuned during the learning process.

In further embodiments, the process can be run in an online fashion for semi real-time synthetic data generation and consumption. In this case, the data collector continues to update the synthetic data as it is generated and processed by the data synthesizer. The third parties can access the current synthetic data in real time.

Figure 2:
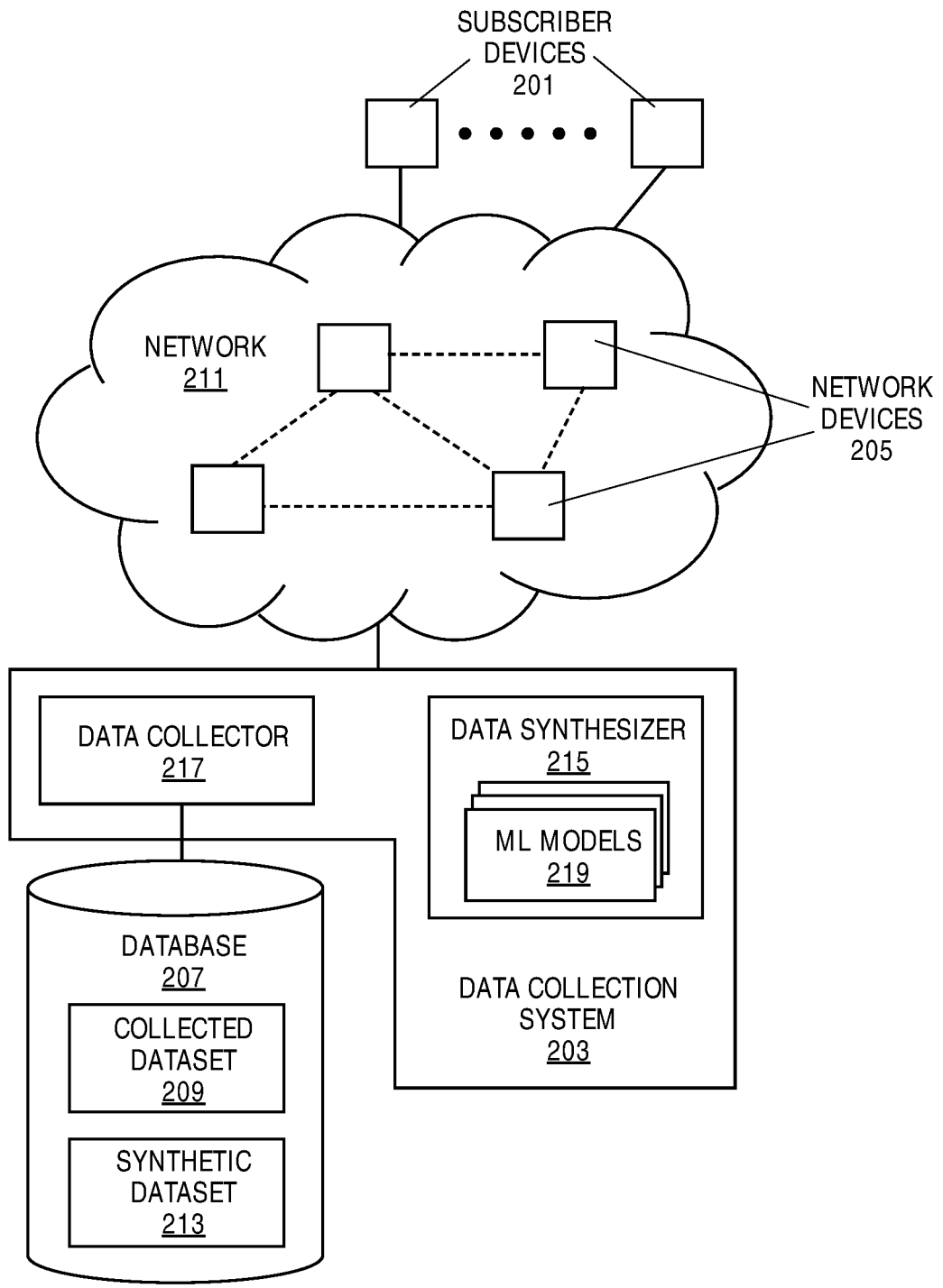
FIG. 2 is a diagram of one embodiment of a data collection system for synthetic data generation.

FIG. 2 is a diagram of one embodiment of a network where data is collected and synthesized. The process described with relation to FIG. 1 can be implemented by a data collection system 203 or similar computing system. The data collection system 203 can be any type or number of computing system including a server system, networking device, cloud computing system, or similar computing system. The data collection system 203 can be communicatively coupled to a network or a set of networks 211. The data collection system 203 can execute a data collector 217 that manages the collection of the data. The data collection system 203 can also execute a data synthesizer 215 that executes the generation of the synthetic data including the execution of the machine-learning models 219. The data collector 217 and data synthesizer 215 can be executed by a same computing system or distributed over multiple computing systems that are part of the data collection system 203.

Collected data can be stored in a database 207. The database 207 can be a relational database or any type of database with any type of database management system. The database 207 can store both collected data sets 209 and synthetic data sets 213 that have been created by the data synthesizer 215. The database 207 can store any number of collected data sets 209 and/or synthetic data sets. The database 207 can be local to the data collection system 203, remote from the data collection system 203, distributed in a cloud system or similarly situated.

The data collector 217 is in communication with a network 211 or similar source of data. The illustrated example of a network 211 is applicable to network data collection for a computing environment in the telecommunications field. This computing environment is provided by way of example and not limitation. In other embodiments, data may be collected from internal components of a computing device, vehicle or similar mechanism. In other embodiments, data may be collected from sensor arrays or Internet of Things (IoT) devices. One skilled in the art would understand that the process of FIG. 1 is provided by way of example and the computing environment of FIG. 2 is similarly provided by way of example.

The network 211 can be any type or size of network including a local area network, wide area network (e.g., the Internet), or similar network. The network 211 can be administered partially or completely by the network operator and can include any combination of fixed and mobile network devices 205 (e.g., cellular telecommunication network devices). Any number, type, and variety of subscriber devices 201 can be connected to the network 211. The subscriber devices 201 can be mobile devices or fixed location computing devices. The subscriber devices 201 can be connected directly or indirectly with the network 211. The subscriber devices 201 and network devices 205 can report network and user data to the data collector 217 periodically, in response to queries from the data collector, on a schedule or similar criteria.

The machine-learning models 219 can be any type of machine-learning models including GANs, other types of neural networks, and supervised learning processes as well as meta learning, reinforcement learning, ensemble learning and similar machine learning processes. Example GANs are described below by way of example and not limitation.

FIG. 3A is a diagram of one embodiment of a first machine-learning model. In this embodiment, a first GAN generator 301 is trained to produce synthetic data and is optimized in a zero-sum game with the GAN discriminator D1 307, which tries to determine if the synthetic data generated by GAN 301 is real or synthetic with respect to a sample 305 of the original collected data set 209.

When the first machine-learning model runs for the first time, the time required to train GAN generator 301 takes longer. In subsequent iterations, when the first machine-learning model is run to adjust the GAN generator 301 weights to make sure threshold T1 is met, the time required to train GAN generator 301 is less as the first machine-learning model starts with a pre-trained GAN generator 301. Threshold T1 determines the maximum percentage (P %) of the data that can be classified as synthetic by the GAN discriminator 307.

The threshold T1 is set by the data collector depending on required accuracy of the synthetic data ($X_{syn}$) with relation to the real data ($X_{real}$). This threshold could be set depending on the receiving organization's request and/or machine-learning model sensitivity where the data is being used.

In some embodiments, when the first machine-learning model runs for the first time, T1 could be set to 100% non-detectable synthetic data. This is a hyperparameter to be tuned during training as overtraining the GAN generator 301 in the first step may hinder the second machine-learning model's training and vice versa.

FIG. 3B is a second machine-learning model. In this machine-learning model two neural networks form a GAN. The first neural network is a second generator 351 that is pre-trained to generate synthetic data from input random sample data 353. The second neural network 357 is trained as a discriminator that compares the subset of sensitive data from the collected data 359 with the synthetic data produced by the second generator 351. In some embodiments, the second generator is initialized with the most recent weights and configuration of the GAN generator 301. Then, given a threshold T2 that determines the percentage of $c_{sensitive}$ data that can be retrieved from $X_{syn}$, (i.e., a privacy budget), the second generator 351 is trained in another zero-sum game against discriminator 357 which tries to predict actual $c_{sensitive}$ data from the synthetic data ($X_{syn}$) output by the second generator with respect to a sample of the original data set.

Sharing Model and Data Markets

The synthetic data output by the data synthesizer and/or pre-trained machine-learning models based on the synthetic data can be made available in a shared market or similarly made accessible. The process described in the embodiments could be run with various settings, including variations of the accuracy and $c_{sensitive}$ data thresholds T1 and T2. The produced synthetic data can be shared within the owner organization or externally. The sharing market platform can use a versioning system to differentiate output data sets and machine-learning models over time. The versioning system enables the data collector system to keep track of the accuracy quality of data sets.

Figure 4A:
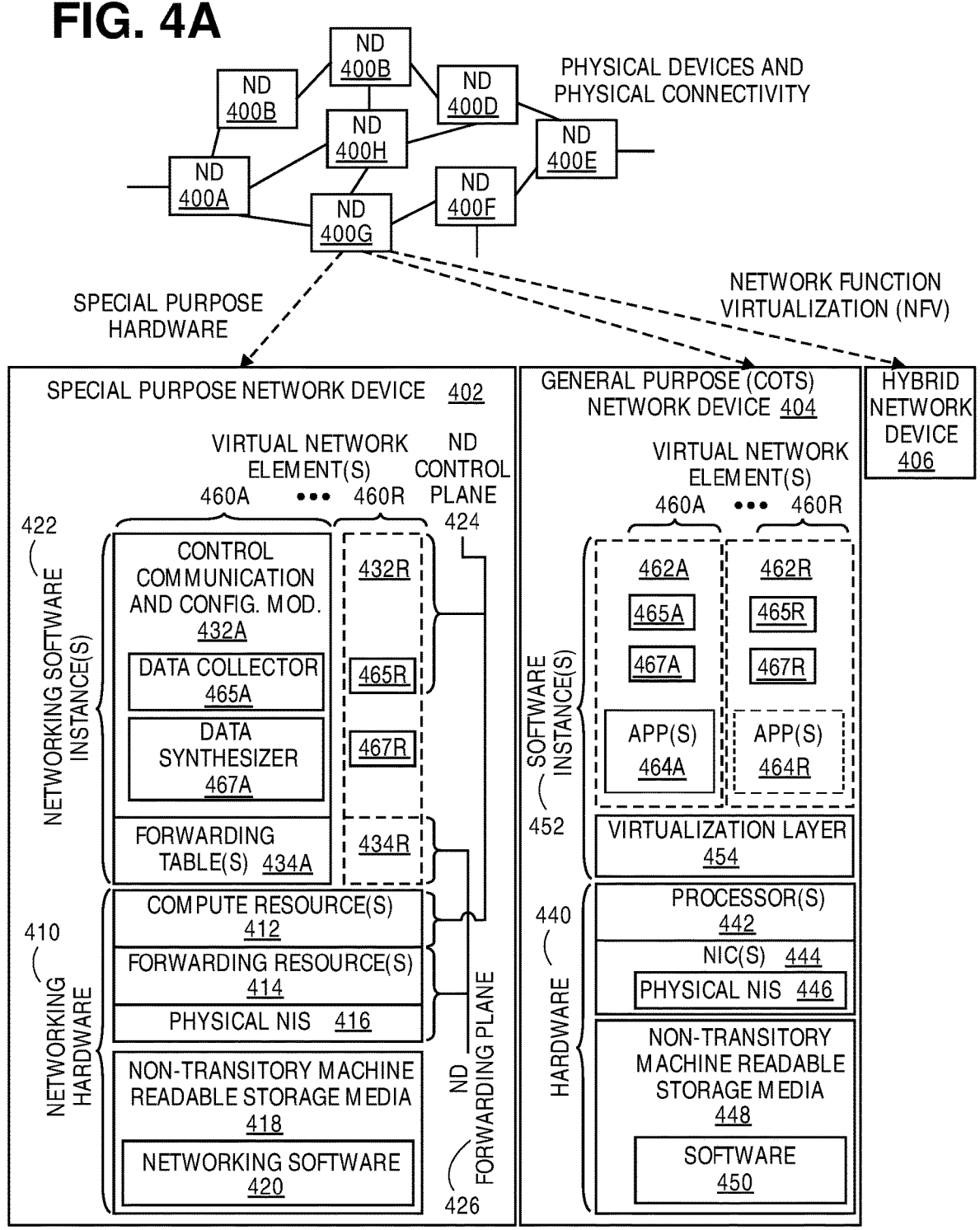
FIG. 4A illustrates connectivity between network devices (NDs) within an exemplary network, as well as three exemplary implementations of the NDs, according to some embodiments of the invention.

FIG. 4A illustrates connectivity between network devices (NDs) within an exemplary network, as well as three exemplary implementations of the NDs, according to some embodiments of the invention. FIG. 4A shows NDs 400A-H, and their connectivity by way of lines between 400A-400B, 400B-400C, 400C-400D, 400D-400E, 400E-400F, 400F-400G, and 400A-400G, as well as between 400H and each of 400A, 400C, 400D, and 400G. These NDs are physical devices, and the connectivity between these NDs can be wireless or wired (often referred to as a link). An additional line extending from NDs 400A, 400E, and 400F illustrates that these NDs act as ingress and egress points for the network (and thus, these NDs are sometimes referred to as edge NDs; while the other NDs may be called core NDs).

Two of the exemplary ND implementations in FIG. 4A are: 1) a special-purpose network device 402 that uses custom application-specific integrated-circuits (ASICs) and a special-purpose operating system (OS); and 2) a general purpose network device 404 that uses common off-the-shelf (COTS) processors and a standard OS.

The special-purpose network device 402 includes networking hardware 410 comprising a set of one or more processor(s) 412, forwarding resource(s) 414 (which typically include one or more ASICs and/or network processors), and physical network interfaces (NIs) 416 (through which network connections are made, such as those shown by the connectivity between NDs 400A-H), as well as non-transitory machine readable storage media 418 having stored therein networking software 420. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs) 430A-R includes a control communication and configuration module 432A-R (sometimes referred to as a local control module or control communication module) and forwarding table(s) 434A-R, such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A).

The special-purpose network device 402 is often physically and/or logically considered to include: 1) a ND control plane 424 (sometimes referred to as a control plane) comprising the processor(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) 434A-R and the physical NIs 416. By way of example, where the ND is a router (or is implementing routing functionality), the ND control plane 424 (the processor(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

Figure 4B:
FIG. 4B illustrates an exemplary way to implement a special-purpose network device according to some embodiments of the invention.

FIG. 4B illustrates an exemplary way to implement the special-purpose network device 402 according to some embodiments of the invention. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VOIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general purpose network device 404 includes hardware 440 comprising a set of one or more processor(s) 442 (which are often COTS processors) and physical NIs 446, as well as non-transitory machine readable storage media 448 having stored therein software 450. During operation, the processor(s) 442 execute the software 450 to instantiate one or more sets of one or more applications 464A-R. While one embodiment does not implement virtualization, alternative embodiments may use different forms of virtualization. For example, in one such alternative embodiment the virtualization layer 454 represents the kernel of an operating system (or a shim executing on a base operating system) that allows for the creation of multiple instances 462A-R called software containers that may each be used to execute one (or more) of the sets of applications 464A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 454 represents a hypervisor (sometimes referred to as a virtual machine monitor (VMM)) or a hypervisor executing on top of a host operating system, and each of the sets of applications 464A-R is run on top of a guest operating system within an instance 462A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 440, directly on a hypervisor (in which case the unikernel is sometimes described as running within a LibOS virtual machine), or in a software container, embodiments can be implemented fully with unikernels running directly on a hypervisor represented by virtualization layer 454, unikernels running within software containers represented by instances 462A-R, or as a combination of unikernels and the above-described techniques (e.g., unikernels and virtual machines both run directly on a hypervisor, unikernels and sets of applications that are run in different software containers).

The instantiation of the one or more sets of one or more applications 464A-R, as well as virtualization if implemented, are collectively referred to as software instance(s) 452. Each set of applications 464A-R, corresponding virtualization construct (e.g., instance 462A-R) if implemented, and that part of the hardware 440 that executes them (be it hardware dedicated to that execution and/or time slices of hardware temporally shared), forms a separate virtual network element(s) 460A-R. The data collector 465A-R and data synthesizer 467A-R as described herein above are examples of the applications that can be run as applications.

The virtual network element(s) 460A-R perform similar functionality to the virtual network element(s) 430A-R—e.g., similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 462A-R corresponding to one VNE 460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 462A-R to VNEs also apply to embodiments where such a finer level of granularity and/or unikernels are used.

In certain embodiments, the virtualization layer 454 includes a virtual switch that provides similar forwarding services as a physical Ethernet switch. Specifically, this virtual switch forwards traffic between instances 462A-R and the physical NI(s) 446, as well as optionally between the instances 462A-R; in addition, this virtual switch may enforce network isolation between the VNEs 460A-R that by policy are not permitted to communicate with each other (e.g., by honoring virtual local area networks (VLANs)).

The third exemplary ND implementation in FIG. 4A is a hybrid network device 406, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R, and those in the hybrid network device 406) receives data on the physical NIs (e.g., 416, 446) and forwards that data out the appropriate ones of the physical NIs (e.g., 416, 446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 4C:
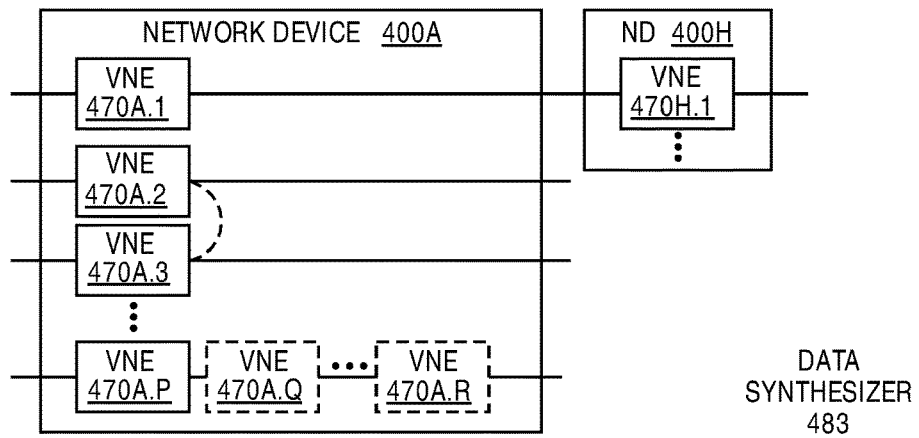
FIG. 4C illustrates various exemplary ways in which virtual network elements (VNEs) may be coupled according to some embodiments of the invention.

FIG. 4C illustrates various exemplary ways in which VNEs may be coupled according to some embodiments of the invention. FIG. 4C shows VNEs 470A.1-470A.P (and optionally VNEs 470A.Q-470A.R) implemented in ND 400A and VNE 470H.1 in ND 400H. In FIG. 4C, VNEs 470A.1-P are separate from each other in the sense that they can receive packets from outside ND 400A and forward packets outside of ND 400A; VNE 470A. 1 is coupled with VNE 470H.1, and thus they communicate packets between their respective NDs; VNE 470A.2-470A.3 may optionally forward packets between themselves without forwarding them outside of the ND 400A; and VNE 470A.P may optionally be the first in a chain of VNEs that includes VNE 470A.Q followed by VNE 470A.R (this is sometimes referred to as dynamic service chaining, where each of the VNEs in the series of VNEs provides a different service—e.g., one or more layer 4-7 network services). While FIG. 4C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 4A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 4A may also host one or more such servers (e.g., in the case of the general purpose network device 404, one or more of the software instances 462A-R may operate as servers; the same would be true for the hybrid network device 406; in the case of the special-purpose network device 402, one or more such servers could also be run on a virtualization layer executed by the processor(s) 412); in which case the servers are said to be co-located with the VNEs of that ND.

A virtual network is a logical abstraction of a physical network (such as that in FIG. 4A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 4D:
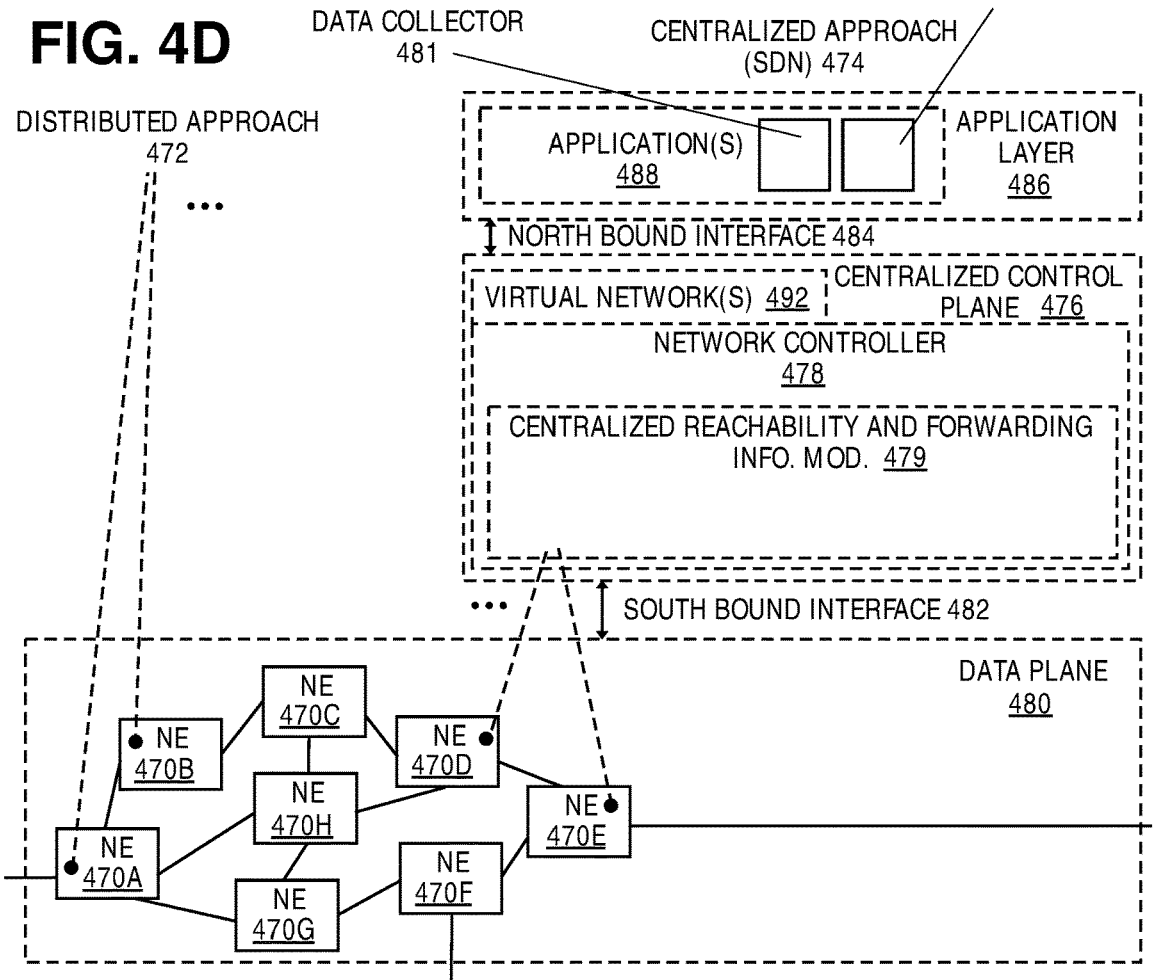
FIG. 4D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 4D illustrates a network with a single network element on each of the NDs of FIG. 4A, and within this straight forward approach contrasts a traditional distributed approach (commonly used by traditional routers) with a centralized approach for maintaining reachability and forwarding information (also called network control), according to some embodiments of the invention. Specifically, FIG. 4D illustrates network elements (NEs) 470A-H with the same connectivity as the NDs 400A-H of FIG. 4A.

FIG. 4D illustrates that the distributed approach 472 distributes responsibility for generating the reachability and forwarding information across the NEs 470A-H; in other words, the process of neighbor discovery and topology discovery is distributed.

For example, where the special-purpose network device 402 is used, the control communication and configuration module(s) 432A-R of the ND control plane 424 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 470A-H (e.g., the processor(s) 412 executing the control communication and configuration module(s) 432A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 424. The ND control plane 424 programs the ND forwarding plane 426 with information (e.g., adjacency and route information) based on the routing structure(s). For example, the ND control plane 424 programs the adjacency and route information into one or more forwarding table(s) 434A-R (e.g., Forwarding Information Base (FIB), Label Forwarding Information Base (LFIB), and one or more adjacency structures) on the ND forwarding plane 426. For layer 2 forwarding, the ND can store one or more bridging tables that are used to forward data based on the layer 2 information in that data. While the above example uses the special-purpose network device 402, the same distributed approach 472 can be implemented on the general purpose network device 404 and the hybrid network device 406.

FIG. 4D illustrates that a centralized approach 474 (also known as software defined networking (SDN)) that decouples the system that makes decisions about where traffic is sent from the underlying systems that forwards traffic to the selected destination. The illustrated centralized approach 474 has the responsibility for the generation of reachability and forwarding information in a centralized control plane 476 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 476 has a south bound interface 482 with a data plane 480 (sometime referred to the infrastructure layer, network forwarding plane, or forwarding plane (which should not be confused with a ND forwarding plane)) that includes the NEs 470A-H (sometimes referred to as switches, forwarding elements, data plane elements, or nodes). The centralized control plane 476 includes a network controller 478, which includes a centralized reachability and forwarding information module 479 that determines the reachability within the network and distributes the forwarding information to the NEs 470A-H of the data plane 480 over the south bound interface 482 (which may use the OpenFlow protocol). Thus, the network intelligence is centralized in the centralized control plane 476 executing on electronic devices that are typically separate from the NDs.

For example, where the special-purpose network device 402 is used in the data plane 480, each of the control communication and configuration module(s) 432A-R of the ND control plane 424 typically include a control agent that provides the VNE side of the south bound interface 482. In this case, the ND control plane 424 (the processor(s) 412 executing the control communication and configuration module(s) 432A-R) performs its responsibility for participating in controlling how data (e.g., packets) is to be routed (e.g., the next hop for the data and the outgoing physical NI for that data) through the control agent communicating with the centralized control plane 476 to receive the forwarding information (and in some cases, the reachability information) from the centralized reachability and forwarding information module 479 (it should be understood that in some embodiments of the invention, the control communication and configuration module(s) 432A-R, in addition to communicating with the centralized control plane 476, may also play some role in determining reachability and/or calculating forwarding information-albeit less so than in the case of a distributed approach; such embodiments are generally considered to fall under the centralized approach 474, but may also be considered a hybrid approach).

While the above example uses the special-purpose network device 402, the same centralized approach 474 can be implemented with the general purpose network device 404 (e.g., each of the VNE 460A-R performs its responsibility for controlling how data (e.g., packets) is to be routed (e.g., the next hop for the data and the outgoing physical NI for that data) by communicating with the centralized control plane 476 to receive the forwarding information (and in some cases, the reachability information) from the centralized reachability and forwarding information module 479; it should be understood that in some embodiments of the invention, the VNEs 460A-R, in addition to communicating with the centralized control plane 476, may also play some role in determining reachability and/or calculating forwarding information-albeit less so than in the case of a distributed approach) and the hybrid network device 406. In fact, the use of SDN techniques can enhance the NFV techniques typically used in the general purpose network device 404 or hybrid network device 406 implementations as NFV is able to support SDN by providing an infrastructure upon which the SDN software can be run, and NFV and SDN both aim to make use of commodity server hardware and physical switches.

FIG. 4D also shows that the centralized control plane 476 has a north bound interface 484 to an application layer 486, in which resides application(s) 488. The centralized control plane 476 has the ability to form virtual networks 492 (sometimes referred to as a logical forwarding plane, network services, or overlay networks (with the NEs 470A-H of the data plane 480 being the underlay network)) for the application(s) 488. Thus, the centralized control plane 476 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The applications 488 can include the data synthesizer 483 and data collector 481 as described herein above.

While FIG. 4D shows the distributed approach 472 separate from the centralized approach 474, the effort of network control may be distributed differently or the two combined in certain embodiments of the invention. For example: 1) embodiments may generally use the centralized approach (SDN) 474, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 474, but may also be considered a hybrid approach.

While FIG. 4D illustrates the simple case where each of the NDs 400A-H implements a single NE 470A-H, it should be understood that the network control approaches described with reference to FIG. 4D also work for networks where one or more of the NDs 400A-H implement multiple VNEs (e.g., VNEs 430A-R, VNEs 460A-R, those in the hybrid network device 406). Alternatively or in addition, the network controller 478 may also emulate the implementation of multiple VNEs in a single ND. Specifically, instead of (or in addition to) implementing multiple VNEs in a single ND, the network controller 478 may present the implementation of a VNE/NE in a single ND as multiple VNEs in the virtual networks 492 (all in the same one of the virtual network(s) 492, each in different ones of the virtual network(s) 492, or some combination). For example, the network controller 478 may cause an ND to implement a single VNE (a NE) in the underlay network, and then logically divide up the resources of that NE within the centralized control plane 476 to present different VNEs in the virtual network(s) 492 (where these different VNEs in the overlay networks are sharing the resources of the single VNE/NE implementation on the ND in the underlay network).

Figure 4E:
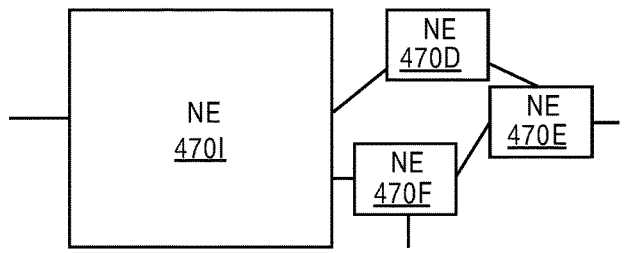
FIG. 4E illustrates the simple case of where each of the NDs implements a single NE, but a centralized control plane has abstracted multiple of the NEs in different NDs into (to represent) a single NE in one of the virtual network(s), according to some embodiments of the invention.
Figure 4F:
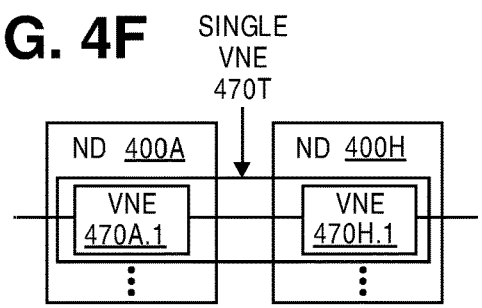
FIG. 4F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 4E and 4F respectively illustrate exemplary abstractions of NEs and VNEs that the network controller 478 may present as part of different ones of the virtual networks 492. FIG. 4E illustrates the simple case of where each of the NDs 400A-H implements a single NE 470A-H (see FIG. 4D), but the centralized control plane 476 has abstracted multiple of the NEs in different NDs (the NEs 470A-C and G-H) into (to represent) a single NE 470I in one of the virtual network(s) 492 of FIG. 4D, according to some embodiments of the invention. FIG. 4E shows that in this virtual network, the NE 470I is coupled to NE 470D and 470F, which are both still coupled to NE 470E.

FIG. 4F illustrates a case where multiple VNEs (VNE 470A.1 and VNE 470H.1) are implemented on different NDs (ND 400A and ND 400H) and are coupled to each other, and where the centralized control plane 476 has abstracted these multiple VNEs such that they appear as a single VNE 470T within one of the virtual networks 492 of FIG. 4D, according to some embodiments of the invention. Thus, the abstraction of a NE or VNE can span multiple NDs.

While some embodiments of the invention implement the centralized control plane 476 as a single entity (e.g., a single instance of software running on a single electronic device), alternative embodiments may spread the functionality across multiple entities for redundancy and/or scalability purposes (e.g., multiple instances of software running on different electronic devices).

Figure 5:
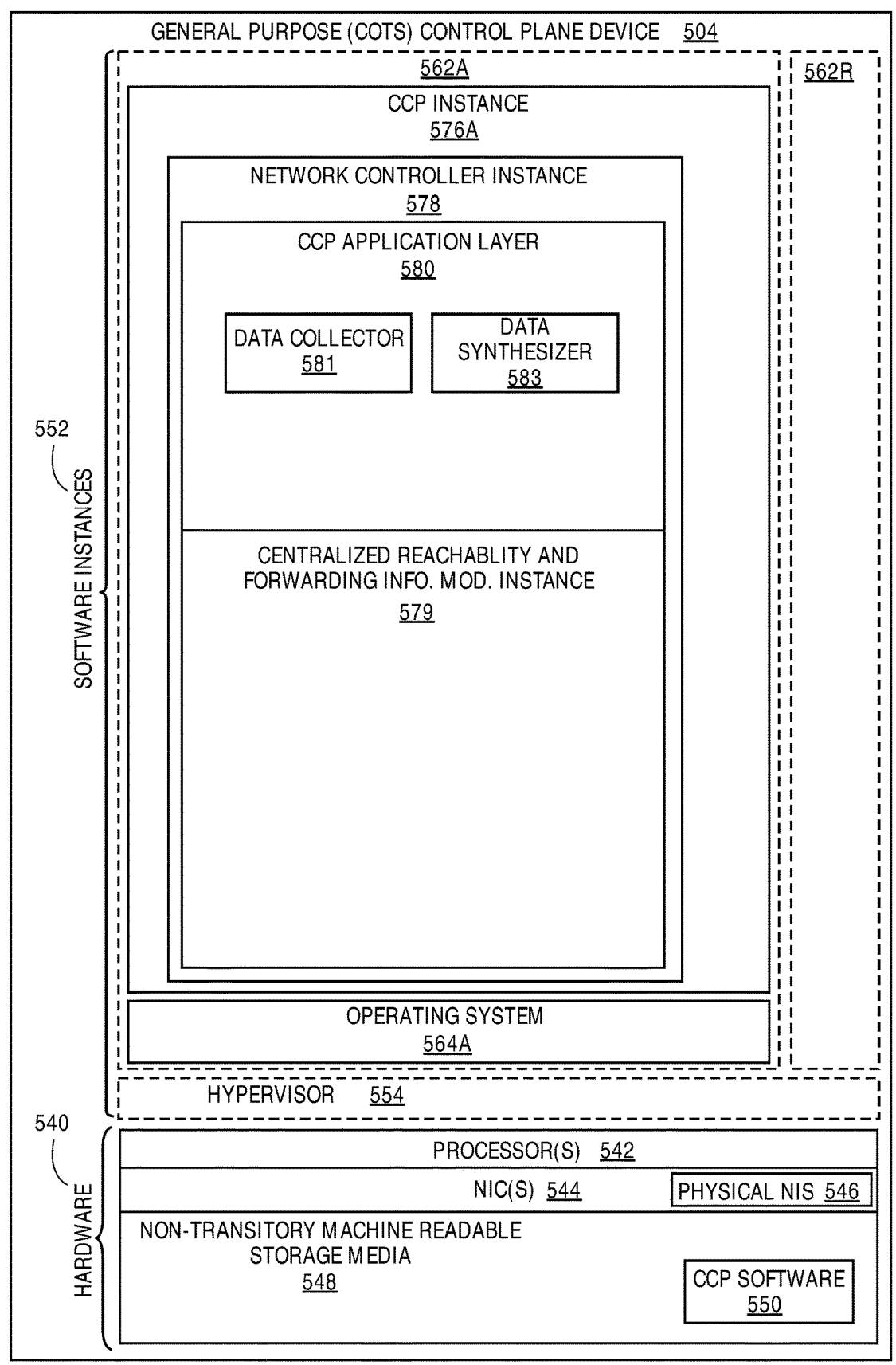
FIG. 5 illustrates a general purpose control plane device with centralized control plane (CCP) software 550), according to some embodiments of the invention.

Similar to the network device implementations, the electronic device(s) running the centralized control plane 476, and thus the network controller 478 including the centralized reachability and forwarding information module 479, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 5 illustrates, a general purpose control plane device 504 including hardware 540 comprising a set of one or more processor(s) 542 (which are often COTS processors) and physical NIs 546, as well as non-transitory machine readable storage media 548 having stored therein centralized control plane (CCP) software 550.

In embodiments that use compute virtualization, the processor(s) 542 typically execute software to instantiate a virtualization layer 554 (e.g., in one embodiment the virtualization layer 554 represents the kernel of an operating system (or a shim executing on a base operating system) that allows for the creation of multiple instances 562A-R called software containers (representing separate user spaces and also called virtualization engines, virtual private servers, or jails) that may each be used to execute a set of one or more applications; in another embodiment the virtualization layer 554 represents a hypervisor (sometimes referred to as a virtual machine monitor (VMM)) or a hypervisor executing on top of a host operating system, and an application is run on top of a guest operating system within an instance 562A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 540, directly on a hypervisor represented by virtualization layer 554 (in which case the unikernel is sometimes described as running within a LibOS virtual machine), or in a software container represented by one of instances 562A-R). Again, in embodiments where compute virtualization is used, during operation an instance of the CCP software 550 (illustrated as CCP instance 576A) is executed (e.g., within the instance 562A) on the virtualization layer 554. In embodiments where compute virtualization is not used, the CCP instance 576A is executed, as a unikernel or on top of a host operating system, on the "bare metal" general purpose control plane device 504. The instantiation of the CCP instance 576A, as well as the virtualization layer 554 and instances 562A-R if implemented, are collectively referred to as software instance(s) 552.

In some embodiments, the CCP instance 576A includes a network controller instance 578. The network controller instance 578 includes a centralized reachability and forwarding information module instance 579 (which is a middleware layer providing the context of the network controller 478 to the operating system and communicating with the various NEs), and an CCP application layer 580 (sometimes referred to as an application layer) over the middleware layer (providing the intelligence required for various network operations such as protocols, network situational awareness, and user-interfaces). At a more abstract level, this CCP application layer 580 within the centralized control plane 476 works with virtual network view(s) (logical view(s) of the network) and the middleware layer provides the conversion from the virtual networks to the physical view. The data collector 581 and data synthesizer 583 as described herein above can be implemented in the application layer 580 or similar location within the control plane device 504.

The centralized control plane 476 transmits relevant messages to the data plane 480 based on CCP application layer 580 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 480 may receive different messages, and thus different forwarding information. The data plane 480 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 480, the packet (or a subset of the packet header and content) is typically forwarded to the centralized control plane 476. The centralized control plane 476 will then program forwarding table entries into the data plane 480 to accommodate packets belonging to the flow of the unknown packet. Once a specific forwarding table entry has been programmed into the data plane 480 by the centralized control plane 476, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a computer for generating synthetic data by a data collection system, the method comprising:
    collecting data including sensitive data and non-sensitive data associated with a network and subscribers of the network;
    organizing the data in a tabular form in time series into subsets and identifying subsets containing the sensitive data;
    executing a first generative adversarial network (GAN) to generate the synthetic data from the organized data where the synthetic data has characteristics similar to the collected data and does not exceed a first threshold, wherein the first threshold determines a maximum percentage of data that is classified as synthetic data;
    executing a second GAN to update the synthetic data so that a discriminator in the second GAN does not predict the sensitive data based on a second threshold, in order to anonymize the sensitive data from being recovered from updated synthetic data, wherein the second threshold determines a percentage of sensitive data that can be retrieved from the updated synthetic data;
    checking whether the updated synthetic data meets the first threshold;
    releasing the updated synthetic data where the first threshold is met; and
    re-executing the first GAN and the second GAN to further update the updated synthetic data where the first threshold is not met during the checking.

2. The method of claim 1, further comprising:
    applying different second threshold values for different subsets identified as containing the sensitive data to meet different privacy budgets.

3. The method of claim 1, further comprising:
    continuously updating the synthetic data with updated collected data by re-executing the first GAN and the second GAN to provide real-time updated synthetic data.

4. The method of claim 1, wherein the first GAN has a first neural network to generate synthetic data and a second neural network to discriminate between the synthetic data and the organized data in a zero sum game.

5. The method of claim 4, wherein the second neural network tests to determine whether the synthetic data meets the first threshold.

6. The method of claim 5, wherein the second GAN has a third neural network to generate the updated synthetic data and a fourth neural network to discriminate between the updated synthetic data and the sensitive data in a zero sum game.

7. The method of claim 6, wherein the fourth neural network tests to determine whether the updated synthetic data meets the second threshold.

8. A non-transitory machine-readable medium having stored therein a set of instructions which when executed cause a computing system to perform a set of operations in a method of generating synthetic data by a data collection system, the set of operations comprising:
    collecting data including sensitive data and non-sensitive data associated with a network and subscribers of the network;
    organizing the data in a tabular form in time series into subsets and identifying subsets containing the sensitive data;
    executing a first generative adversarial network (GAN) to generate the synthetic data from the organized data where the synthetic data has characteristics similar to the collected data and does not exceed a first threshold, wherein the first threshold determines a maximum percentage of data that is classified as synthetic data;
    executing a second GAN to update the synthetic data so that a discriminator in the second GAN does not predict the sensitive data based on a second threshold, in order to anonymize the sensitive data from being recovered from updated synthetic data, wherein the second threshold determines a percentage of sensitive data that can be retrieved from the updated data;
    checking whether the updated synthetic data meets the first threshold;
    releasing the updated synthetic data where the first threshold is met; and
    re-executing the first GAN and the second GAN to further update the updated synthetic data where the first threshold is not met during the checking.

9. The non-transitory machine-readable medium of claim 8, wherein the set of operations further comprising:

applying different second threshold values for different subsets identified as containing the sensitive data to meet different privacy budgets.

10. The non-transitory machine-readable medium of claim 8, wherein the set of operations further comprising:
continuously updating the synthetic data with updated collected data by re-executing the first GAN and the second GAN to provide real-time updated synthetic data.

11. The non-transitory machine-readable medium of claim 8, wherein the first GAN has a first neural network to generate synthetic data and a second neural network to discriminate between the synthetic data and the organized data in a zero sum game.

12. The non-transitory machine-readable medium of claim 11, wherein the second neural network tests to determine whether the synthetic data meets the first threshold.

13. The non-transitory machine-readable medium of claim 12, wherein the second GAN has a third neural network to generate the updated synthetic data and a fourth neural network to discriminate between the updated synthetic data and the sensitive data in a zero sum game.

14. The non-transitory machine-readable medium of claim 13, wherein the fourth neural network tests to determine whether the updated synthetic data meets the second threshold.

15. A computer system to implement a method of generating synthetic data, the computer system comprising:
a non-transitory machine-readable medium having stored therein a data collector and a data synthesizer; and
a processor coupled to the non-transitory machine-readable medium, the processor to execute the data collector and the data synthesizer, wherein the data collector to collect data including sensitive data and non-sensitive data associated with a network and subscribers of the network, and wherein the data synthesizer to organize the data in a tabular form in time series into subsets and identifying subsets containing the sensitive data, to execute a first generative adversarial network (GAN) to generate the synthetic data from the organized data where the synthetic data has characteristics similar to the collected data and does not exceed a first threshold, wherein the first threshold determines a maximum percentage of data that is classified as synthetic data, to execute a second GAN to update the synthetic data so that a discriminator in the second GAN does not predict the sensitive data based on a second threshold, in order to anonymize the sensitive data from being recovered from updated synthetic data, wherein the second threshold determines a percentage of sensitive data that can be retrieved from the updated synthetic data, to check whether the updated synthetic data meets the first threshold, to release the updated synthetic data where the first threshold is met, and to re-execute the first GAN and the second GAN to further update the updated synthetic data where the first threshold is not met during the checking.

16. The computer system of claim 15, wherein the data synthesizer is further to apply different second threshold values for different subsets identified as containing the sensitive data to meet different privacy budgets.

17. The computer system of claim 15, wherein the data synthesizer is to continuously update the synthetic data with updated collected data by re-executing the first GAN and the second GAN to provide real-time updated synthetic data.

* * * * *